United States Patent Office 2,765,217
Patented Oct. 2, 1956

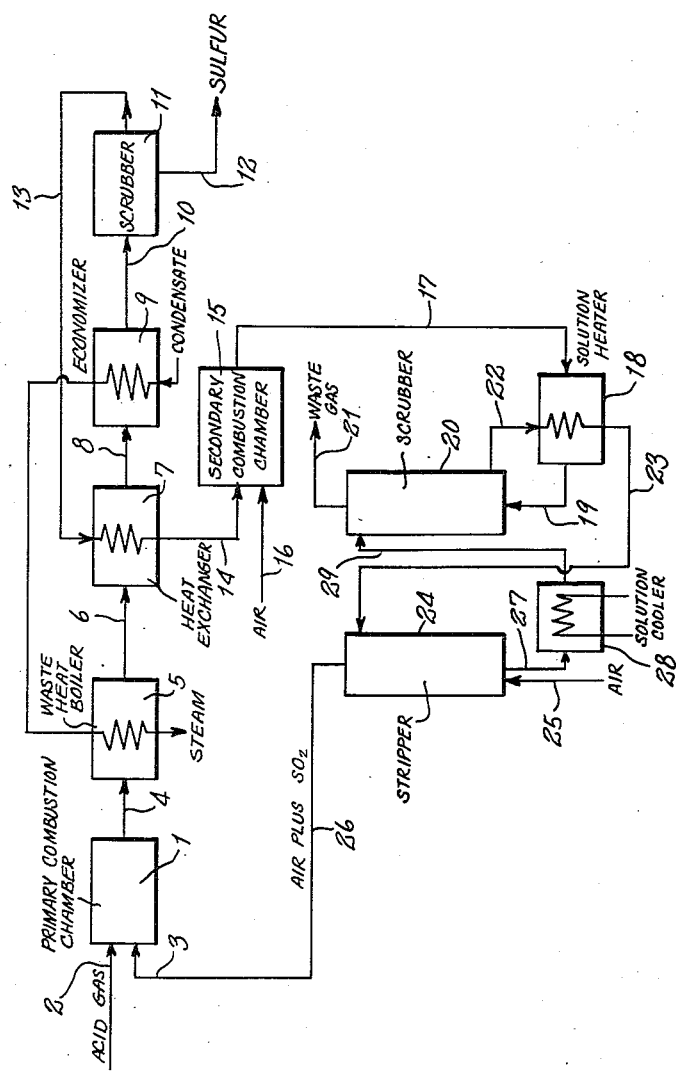

2,765,217

CYCLIC PROCESS FOR RECOVERING SULFUR FROM HYDROGEN SULFIDE

Edward H. Conroy, Jr., Worland, Wyo., and David K. Eads and James R. West, Pittsburgh, Pa., assignors to Texas Gulf Sulphur Company, New York, N. Y., a corporation of Texas Application July 9, 1952, Serial No. 297,953

6 Claims. (Cl. 23—225)

This invention relates to the recovery of sulfur from hydrogen sulfide-bearing gases.

Heretofore hydrogen sulfide has been converted to sulfur by oxidation by a variety of processes. In substantially all of these air is introduced into the hydrogen sulfide-bearing gas, preferably in stoichiometric quantities, to convert the hydrogen sulfide to sulfur. The gases may be reacted either with or without a catalyst and at a variety of temperatures.

In the processes heretofore employed, the following reactions are commonly believed to occur:

$$H_2S + \tfrac{3}{2}O_2 \longrightarrow SO_2 + H_2O \tag{1}$$

$$2H_2S + SO_2 \longrightarrow 3S + 2H_2O \tag{2}$$

$$H_2S + \tfrac{1}{2}O_2 = S + H_2O \tag{3}$$

The second and third reactions above set forth do not go to completion, so that there is not complete conversion of the hydrogen sulfide to sulfur.

Many attempts have been made in the past to approach complete conversion of the hydrogen sulfide. In some cases the gases are cooled to strip them of sulfur. They are then reheated and passed to catalyst converters and they are stripped of sulfur again. Even when these various steps are employed, however, the conversion seldom runs above 90% or 95%. In a properly operated plant both hydrogen sulfide and sulfur dioxide would be discharged simultaneously into the atmosphere, resulting both in undesirable contamination of the atmosphere and loss of sulfur.

One object of the present invention is to overcome the disadvantages of the above-mentioned processes.

Another object is to provide a method of converting hydrogen sulfide to sulfur in which substantially quantitative conversion and recovery of sulfur takes place.

Another object is to provide a method which is suitable for use in purifying waste gases, such as acid gas or sour gas, for the purposes above set forth.

Another object is to provide such a process which can be carried out easily and inexpensively.

Another object is to provide such a process which can be coupled with other known processes to effect substantially quantitative removal or conversion of hydrogen sulfide and recovery of sulfur.

In general this invention contemplates a cyclic method in which the hydrogen sulfide is converted with oxygen obtained from air or sulfur dioxide.

The oxygen and sulfur dioxide are introduced into the hydrogen sulfide-bearing gas and preferably in stoichiometric quantities for converting the hydrogen sulfide to sulfur. The reaction may be carried out with or without a catalyst. Thereafter the gases are cooled to condense the sulfur which is then removed.

Thereafter the gases are taken to a secondary combustion chamber where sufficient oxygen is employed to oxidize the unreacted hydrogen sulfide and the uncondensed sulfur to sulfur dioxide.

The gases are then subjected to the action of a sulfur dioxide recovery or concentrating system in which the sulfur dioxide is recovered from the waste gases.

For example, this may be done in a liquid absorption system. The sulfur dioxide may be absorbed by a liquid absorbent. Thereafter the sulfur dioxide is stripped from the absorbent.

When a liquid absorbent is used this can be accomplished by bubbling oxygen through the absorbent in a conventional manner. The quantity of oxygen is controlled so as to provide that the sulfur dioxide stripped from the absorbent has substantially stoichiometric quantities of oxygen and sulfur dioxide for introduction into the hydrogen sulfide-bearing gases to convert the hydrogen sulfide to sulfur.

Throughout this specification when reference is had to "oxygen" it will be understood, of course, that it is contemplated that oxygen-bearing gases, such as air, are included.

For the purpose of illustrating the invention, there is shown in the accompanying drawing a flow sheet of a process embodying the invention which has been found in practice to give satisfactory and reliable results, although it is to be understood that the invention can be employed in connection with other processes involving the conversion of hydrogen sulfide in hydrogen sulfide-bearing gases to sulfur and that the invention is not limited to the particular process shown and described.

In carrying out the process, the hydrogen sulfide-bearing gas is introduced into a primary combustion chamber 1, as indicated at 2. There is also introduced, as indicated at 3, a mixture of oxygen or air and sulfur dioxide. The oxygen and sulfur dioxide are in controlled quantities to provide stiochiometric quantities of oxygen for converting the hydrogen sulfide to sulfur.

Any desired and effective temperature which is well known in the art may be maintained in the primary combustion chamber.

The gases leaving the primary combustion chamber pass, as indicated at 4, to a waste heat boiler 5, where they are cooled. They then pass, as indicated at 6, to a heat exchanger 7, where they are further cooled. They then pass, as indicated at 8, to an economizer 9 where further cooling takes place. They then pass, as indicated at 10, to a scrubber 11, where the sulfur is condensed and removed as indicated at 12. The gases then pass, as indicated at 13, preferably through the heat exchanger 7, and as indicated at 14, to a secondary combustion chamber 15. There oxygen is introduced, as indicated at 16, preferably in stoichiometric quantities to convert the unreacted hydrogen sulfide and uncondensed sulfur into sulfur dioxide. The gases then pass, as indicated at 17, to a solution heater 18, which is adapted to heat absorbent passing from a scrubber to a stripper, as will be described hereinafter. The gases then pass, as indicated at 19, to a scrubber 20, where they are subjected to the action of a liquid absorbent, such as dimethylaniline or a boric acid borax solution in water. The waste gases from which the sulfur dioxide has been stripped in the scrubber pass to the atmosphere, as indicated at 21.

The liquid absorbent with the absorbed sulfur dioxide passes as indicated at 22 to the solution heater 18, where the absorbent is heated. It then passes, as indicated at 23, to a stripper 24.

As indicated at 25, oxygen is introduced into the stripper to strip the sulfur dioxide from the absorbent. The oxygen introduced at this point passes from the stripper, as indicated at 26, to pass to the primary combustion chamber. It is preferred at this point to control the oxygen employed in stripping the sulfur dioxide from the absorbent so that the combined oxygen and sulfur dioxide passing to the primary combustion chamber will provide stoichiometric quantities of oxygen for conversion of the hydrogen sulfide in the gases to be treated to sulfur.

The absorbent passes, as indicated at 27, to a solution cooler 28, where it is conditioned for absorbing. It then passes, as indicated at 29, to the scrubber 20.

In carrying out this process, the use of the secondary combustion chamber for converting hydrogen sulfide and uncondensed sulfur, if there be any, into sulfur dioxide and the recovery of the sulfur dioxide, whether from the secondary combustion chamber or unreacted sulfur dioxide from the main process, makes it possible to discharge sulfur-free waste gas. The sulfur which is in the form of sulfur dioxide is reintroduced into the cyclic process and since none of the sulfur escapes from the system in the waste gases, it follows that all or substantially all of the hydrogen sulfide must be converted to sulfur.

There has been described a process employed without any catalyst converters, since it can be carried out in this form. However, it will be understood that the process is equally applicable to catalytic processes or to combinations of noncatalytic and catalytic steps employed in converting hydrogen sulfide to sulfur.

It will be apparent therefore that the present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what we claim as new and desire to protect by Letters Patent is:

1. The method of treating hydrogen sulfide bearing gases to remove hydrogen sulfide therefrom and convert it to sulfur comprising introducing oxygen and sulfur dioxide into the hydrogen sulfide bearing gas to be treated in substantially stoichiometric quantities for converting the hydrogen sulfide to sulfur, reacting the hydrogen sulfide with said oxygen and sulfur dioxide to produce sulfur, cooling said gases to condense said sulfur, removing said sulfur, introducing oxygen into said gases in substantially stoichiometric quantities for converting unreacted hydrogen sulfide and uncondensed sulfur to produce sulfur dioxide, subjecting said gases to the action of a liquid absorbent for said sulfur dioxide, separating said gases and said absorbent and discarding the remainder of said gases, stripping said absorbent of the absorbed sulfur dioxide by passing oxygen to be introduced into the hydrogen sulfide bearing gases through said liquid absorbent and controlling the quantity of said oxygen to provide with said oxygen and the sulfur dioxide stripped from said absorbent substantially stoichiometric quantities of oxygen and sulfur dioxide for introduction into the hydrogen sulfide bearing gas to be treated to convert the hydrogen sulfide therein to sulfur and introducing said mixture of oxygen and sulfur dioxide into said gas to be treated and cyclically continuing said process whereby substantially quantitative removal of hydrogen sulfide is effected.

2. The method of treating hydrogen sulfide bearing gases to remove hydrogen sulfide therefrom and convert it to sulfur comprising introducing oxygen and sulfur dioxide into the hydrogen sulfide bearing gas to be treated in substantially stoichiometric quantities for converting the hydrogen sulfide to sulfur, reacting the hydrogen sulfide with said oxygen and sulfur dioxide to produce sulfur, cooling said gases to condense said sulfur, removing said sulfur, introducing oxygen into said gases in substantially stoichiometric quantities for converting all of the unreacted hydrogen sulfide and all of the uncondensed sulfur to produce sulfur dioxide, adsorbing the sulfur dioxide thus produced from converting said unreacted hydrogen sulfide and said uncondensed sulfur by subjecting said gases to the action of an absorbent for said sulfur dioxide, separating said gases and said absorbent and discarding the remainder of said gases, stripping said absorbent of the absorbed sulfur dioxide, adding oxygen to said sulfur dioxide to provide substantially stoichiometric quantities of oxygen and sulfur dioxide for introduction into the hydrogen sulfide bearing gas to be treated to convert the hydrogen sulfide therein to sulfur and introducing said mixture of oxygen and sulfur dioxide into said gas to be treated and cyclically continuing said process whereby substantially quantitative removal of hydrogen sulfide is effected.

3. The method of treating hydrogen sulfide bearing gases to remove hydrogen sulfide therefrom and convert it to sulfur comprising introducing oxygen and sulfur dioxide into the hydrogen sulfide bearing gas to be treated, reacting the hydrogen sulfide with said oxygen and sulfur dioxide to produce sulfur, cooling said gases to condense said sulfur, removing said sulfur, introducing oxygen into said gases in sufficient quantities for converting unreacted hydrogen sulfide and uncondensed sulfur to produce sulfur dioxide, subjecting said gases to the action of a liquid absorbent for said sulfur dioxide, separating said gases and said absorbent and discarding the remainder of said gases, stripping said absorbent of the absorbed sulfur dioxide by passing oxygen to be introduced into the hydrogen sulfide bearing gases through said liquid absorbent and introducing said mixture of oxygen and sulfur dioxide into said gas to be treated and cyclically continuing said process whereby substantially quantitative removal of hydrogen sulfide is effected.

4. The method of treating hydrogen sulfide bearing gases to remove hydrogen sulfide therefrom and convert it to sulfur comprising introducing oxygen and sulfur dioxide into the hydrogen sulfide bearing gas to be treated, reacting the hydrogen sulfide with said oxygen and sulfur dioxide to produce sulfur, cooling said gases to condense said sulfur, removing said sulfur, introducing oxygen into said gases in sufficient quantities for converting unreacted hydrogen sulfide and all of the uncondensed sulfur to produce sulfur dioxide, adsorbing the sulfur dioxide thus produced from converting said unreacted hydrogen sulfide and said uncondensed sulfur by subjecting said gases to the action of an absorbent for said sulfur dioxide, separating said gases and said absorbent and discarding the remainder of said gases, stripping said absorbent of the absorbed sulfur dioxide, adding oxygen to said sulfur dioxide and introducing said mixture of oxygen and sulfur dioxide into said gas to be treated and cyclically continuing said process whereby substantially quantitative removal of hydrogen sulfide is effected.

5. The cyclic method of recovering sulfur from hydrogen sulfide comprising oxidizing said hydrogen sulfide to sulfur by reaction with stoichiometric quantities of oxygen supplied from a source selected from the group consisting of oxygen and sulfur dioxide, stripping sulfur so produced from the reaction gases, reacting the residue of the reaction gases with oxygen to produce sulfur dioxide from all of the remaining unreacted hydrogen sulfide and all of the unremoved sulfur, absorbing the sulfur dioxide from said residual gases, stripping the sulfur dioxide from the absorbent and introducing it into the hydrogen sulfide to be reacted to supply at least a portion of the oxygen for oxidizing said hydrogen sulfide in the initial oxidizing step.

6. The cyclic method of recovering sulfur from hydrogen sulfide comprising oxidizing said hydrogen sulfide to sulfur by reaction with oxygen supplied from a source selected from the group consisting of oxygen and sulfur dioxide, stripping sulfur so produced from the reaction gases, reacting the residue of the reaction gases with oxygen to produce sulfur dioxide from all of the remaining unreacted hydrogen sulfide and all of the unremoved sulfur, absorbing the sulfur dioxide from said residual gases, stripping the sulfur dioxide from the absorbent and introducing it into the hydrogen sulfide to be reacted to supply at least a portion of the oxygen for oxidizing said hydrogen sulfide in the initial oxidizing step.

References Cited in the file of this patent

UNITED STATES PATENTS

| | | |
|---|---|---|
| 1,507,105 | Carstens et al. | Sept. 2, 1924 |
| 1,904,424 | Edmonds et al. | Apr. 18, 1933 |
| 2,169,379 | Barkholt | Aug. 15, 1939 |
| 2,413,714 | Keeling | Jan. 7, 1947 |
| 2,630,374 | Miller | Mar. 3, 1953 |